US012769463B2

(12) United States Patent
Arunachalam

(10) Patent No.: US 12,769,463 B2
(45) Date of Patent: Oct. 20, 2026

(54) SECURE FLUID MEMORY SUBSETS FOR SELECT DATA-SETS IN MEMORY CENTRIC SYSTEM ARCHITECTURES/FABRIC ATTACHED MEMORY

(71) Applicant: Hewlett Packard Enterprise Development LP, Spring, TX (US)

(72) Inventor: Somasundaram Arunachalam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 36 days.

(21) Appl. No.: 18/885,849

(22) Filed: Sep. 16, 2024

(65) Prior Publication Data

US 2026/0023487 A1 Jan. 22, 2026

(30) Foreign Application Priority Data

Jul. 18, 2024 (IN) ............................ 202441055037

(51) Int. Cl.
*G06F 3/06* (2006.01)
*G06F 21/60* (2013.01)

(52) U.S. Cl.
CPC .......... *G06F 3/0623* (2013.01); *G06F 3/0631* (2013.01); *G06F 3/0673* (2013.01); *G06F 21/602* (2013.01)

(58) Field of Classification Search
CPC ............................ G06F 21/44; G06F 21/6245
See application file for complete search history.

(56) References Cited

U.S. PATENT DOCUMENTS

2016/0253515 A1* 9/2016 Damgård ............. H04L 63/062 713/165
2016/0269418 A1* 9/2016 Sangary .................. G06F 21/44
2020/0233970 A1* 7/2020 Rooks ................... G06F 21/602
2022/0198041 A1* 6/2022 Wilczynski ........... H04L 63/105

* cited by examiner

*Primary Examiner* — Yong J Choe
(74) *Attorney, Agent, or Firm* — Dickinson Wright

(57) ABSTRACT

Systems and methods are provided for secure data subsets in a memory-centric computer system. A method includes receiving, in a computer system, a request for allocation of a region of a memory. The request includes a data-oriented security ranking value associated with a dataset to be stored in the region of memory. The method further includes comparing the data-oriented security ranking value to a first security threshold. In response to determining that the data-oriented security ranking value meets or exceeds the first security threshold, the method includes encrypting the data-set using an encryption key and allocating a region of memory in a portion of the memory reserved for encrypted data.

20 Claims, 10 Drawing Sheets

SECURE FLUID MEMORY SUBSETS FOR SELECT DATA-SETS IN MEMORY CENTRIC SYSTEM ARCHITECTURES/FABRIC ATTACHED MEMORY

CROSS REFERENCE TO RELATED APPLICATIONS

This application claims the priority benefit of, India patent application No. 202441055037, filed on Jul. 18, 2024, the contents of which are incorporated herein by reference in their entirety.

BACKGROUND

High Performance Computing (HPC) may refer to computing solutions (e.g., supercomputers or clusters of computing nodes) that are able to process data and execute calculations at a rate that far exceeds other computing solutions. Examples of HPC applications include software applications (runs on supercomputers or computing node clusters) that model/simulate complex natural systems, genome sequencing, molecular dynamics, etc.

Dynamic memory may refer to computer memory regions that are allocated and/or deallocated (dynamically) during run-time of an application. Dynamic memory can be volatile memory (i.e., computer memory such as random-access-memory (RAM) that requires power to store information) or non-volatile (i.e., computer memory such as non-volatile DIMM (NVDIMM) that stores information even after computer power has been shut off). In this context, the fabric attached memory that consists of aggregation of several memory spaces from different memory sources, such as SSDs, hard disks, optical disks, all flash, etc., in common global address space as byte addreseable memory, thus enabling the extension of DRAM like memory to an unprecedented scale is the emerging paradigm. This kind of memory disaggregated from several physical sources to be presented in a common VAS (virtual address space) for a high performance compute cluster or supercomputer is one of the key factor that enables idle computing environment applications like mod/sim, scientific workflows and so on.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

Figure 1:
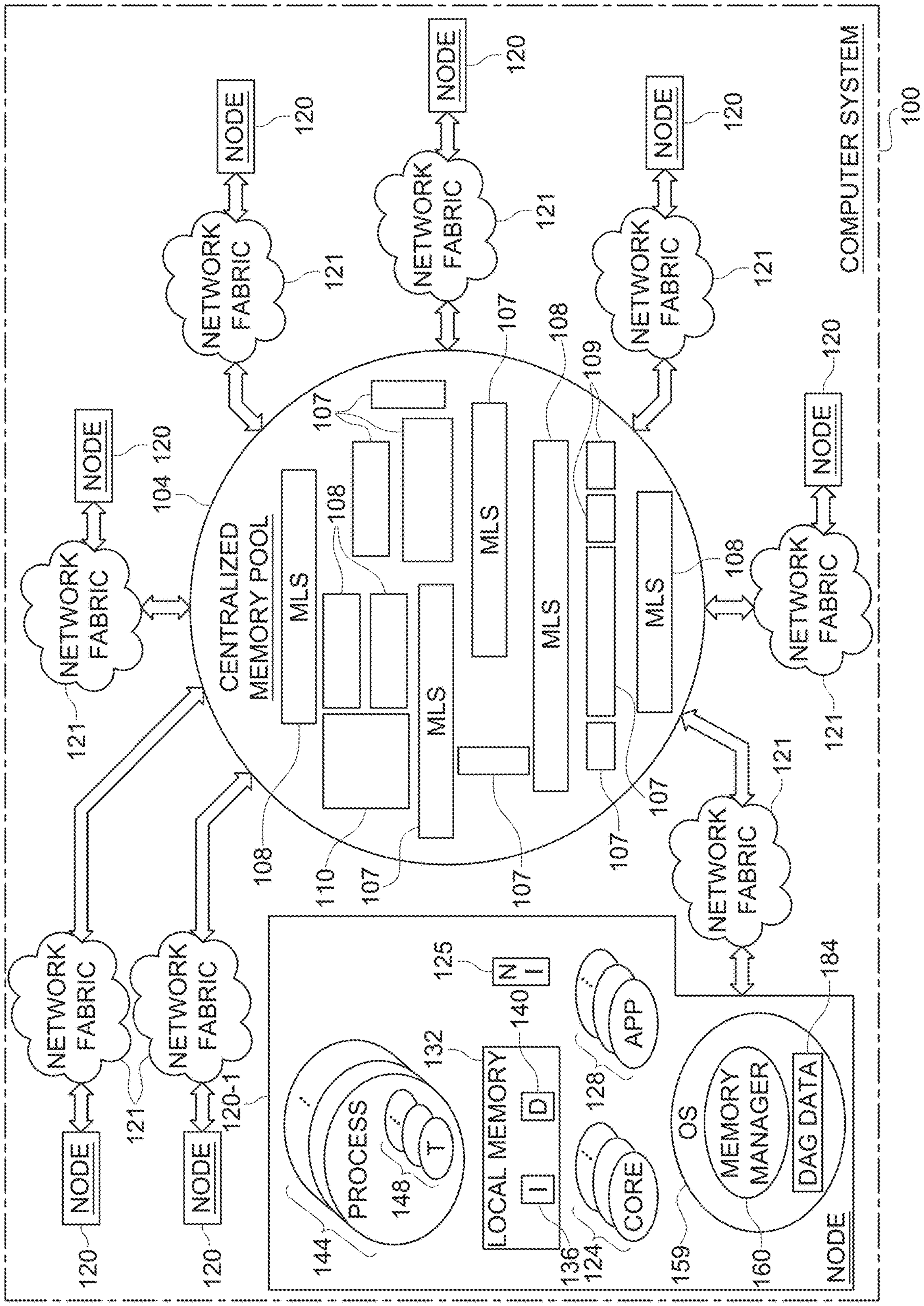
FIG. 1 is a schematic diagram of a memory-oriented distributed computing system having a centralized memory pool that includes secure and non-secure dynamic memory regions, in accordance with various examples of the presently disclosed technology.

The figures are not exhaustive and do not limit the present disclosure to the precise form disclosed.

DETAILED DESCRIPTION

Recent advancements in HPC have enabled science, business, and engineering organizations to solve enormous computational problems that have been historically unsolvable. Examples of HPC applications include software applications (run on supercomputers or clusters of computing nodes) that model/simulate complex natural systems, genome sequencing, molecular dynamics, etc.

In many cases, the above-described HPC applications run continuously for months or even years. During these extended, (and, in some cases, continuous) run-times, HPC applications process/produce massive amounts of data which in many cases evolves over the course of the HPC applications' run-times. For example, and as will be described in greater detail below, an HPC application often creates, and then processes large numbers of nearly congruent "parallel" datasets which may be transformations/modifications of previously processed datasets. Minute differences across certain parallel datasets may be analytically/inferentially significant for the HPC application at an early time interval of the HPC application's run-time, but less analytically/inferentially significant at a later time interval. "Analytically/inferentially" significant as defined herein indicates that the data within the dataset is important for both present analysis as well as for making inferences and/or predictions about larger populations based on that data, analyzed in concurrence with other future data-sets.

Software systems involving such elaborate experiments may leverage snapshots of control, payload and various other custom data in extremely large dynamic memory from centralized memory pool with heterogeneous memory regions, in large numbers that may be called instantaneous value sets. These instantaneous value sets can be derived during cycles/flow of experiments with some tuning done continuously or at discrete time intervals during the execution flow. In such chain of value sets or discrete/exclusive value sets, select data may be encrypted in a specified virtual memory region with a unique security identity. Such encrypted dynamic memory data may be marked to be transferred to persistent memory at a later point, say for instance, by choice it can be placed in the VAS in memory pool that corresponds to physical memory originated from a remotely connected SSD (whose memory is presented as byte addressable memory) or NVDIMM. Alternatively, a thread/process/task that created the secure data may copy it into a file during a process of functional transformation execution or processing of the data exclusively. Generally, large amounts of dynamic memory that includes local DIMM memory and regions of memory from several heterogenous sources that are fabric attached, can be used to support this extremely large chain of instantaneous value sets. At some point in time, as mentioned, one or more of such datasets may become insignificant or no longer useful/ of important when scientific software for such experiments runs continuously on a supercomputer or supercomputing clusters for extended periods of time, such as multiple years (e.g., 2-3 years). Cases in which such scientific software runs for months or days, but nevertheless generate large number of such datasets at many instances during the lifetime of execution are also possible. For facilitation of such experiments, using a technique or method may be provided to encrypt the dynamic data, making the memory lane (defined herein as a region of memory within a certain range of addresses) in which it is present to be one or more secure single/orthogonal memory lanes. Providing such functionality in memory resource management in an HPC cluster provides flexibility, and may allow for novel use cases in designing software. That is, secure memory lane tuning can be performed either during the creation of lane sub-sets or dynamically-based on a point in time to decide whether a memory lane is to contain data in encrypted form. In specific cases of encrypted memory lane data, homomorphic encryption methods are applied, in various implementations, for avoiding the latency during the run time, for functional flows in such software that are performance/time sensitive with respect to the results. Such software may utilize datasets involving complex mathematical calculations or that otherwise deal with n dimensional data (on the order of millions of rows and/or columns, as seen in genome sequencing, feature extraction/cleansing in AI algorithms research and so on).

Accordingly, the present disclosure contemplates various techniques to create data-centric secure, virtual memory, including in the context of extremely large specialized memory (from hybrid sources), resulting in two types of dynamic memory: conventional virtual memory lanes; and memory lanes with secure (encrypted) data. A security threshold value, assigned to virtual memory lanes, marks a boundary to organize secure memory lanes separately from non-secure memory. The disclosure further contemplates a memory manager in a memory fabric, or a supercomputing OS, or a distributed memory fabric-based operating system that allocates memory lanes of dynamically-configurable sizes in required granularities. The memory manager may also provide nested orthogonal sub-laning with data/data-set oriented priority with provisions for watermark/secure virtual memory priority/rank for categorizing plain and secure volatile/runtime data sets in which some of them may become persistent by virtue of the VAS (virtual address space) in which it is present, respectively. The memory lanes in the context of a single scaleup system or in a distributed memory fabric, contain the physical and virtual address mappings as well.

A method according to the disclosure, in one aspect, includes receiving, in a computer system, a request for allocation of a region of a memory, wherein the request includes a data-oriented security ranking value associated with dataset to be stored in the region of memory and comparing the data-oriented security ranking value to a first security threshold. In response to determining that the data-oriented security ranking value meets or exceeds the first security threshold, the method further includes encrypting the dataset using an encryption key and allocating the region of memory in a portion of the memory reserved for encrypted data.

The use of multiple security thresholds (including the first security threshold) are contemplated in various implementations. For example, if the data-oriented security ranking value is equal to or greater than the first security threshold, but less than a second security threshold, the data may be encrypted with a first encryption key associated with one of the suite of encryption methods belonging to the first encryption level. If the data meets or exceeds a second, higher security threshold, the dataset may be encrypted using a second encryption key in same encryption level or from suite of encryption/data obfuscation methods belonging to the a second encryption level.

Implementations in which the encrypted datasets are stored in fluid or non-fluid regions are also contemplated. For example, a first encrypted dataset may be stored in a particular portion of a secure memory region for a predetermined time, and may then be subsequently de-allocated once that time has elapsed. A second encrypted dataset may be stored in a particular portion of a secure memory region for an indefinite time. Portions of memory which are de-allocated after a dataset has been stored therein for predetermined amount of time are herein defined as secure fluid memory regions, while portions in which datasets are stored indefinitely hare herein defined as secure non-fluid memory regions.

Furthermore, secure portions of memory may be subdivided into different portions that are orthogonal to one another. For example, a first encrypted dataset may be stored in a first portion of a secure memory region, while a second encrypted dataset may be stored in a second portion of a secure memory region that is orthogonal to the first. Differently sized and purposed memory lanes (or regions) may be provided with various encryption or data obfuscation threshold ranks such that data stored therein may be encrypted according to a particular encryption key or level of encryption.

The disclosed methods and systems may have various benefits. For example, during complex scientific experiments, storing datasets may be warranted in dynamic memory generated at different time limits whose values are different, but characteristics are same. Sometimes, values are near-congruent but the small difference in values has significant meaning such that one of the value sets has to be in encrypted form throughout its lifetime in virtual memory, and the intended process is provided with access of the decrypted data or memory manager provides secure provisions to make the key available to that process for a transient time period, such that only it can decrypt the one of the value sets. Moreover, with large amounts of dynamic memory shared among a large number of heterogeneous compute entities connected to the centralized memory pool, the various methods described herein may provide run time security for datasets through memory manager provisions, intended for use only by a specific entity or entities.

Various systems and methods that implement encryption and storage of datasets in secure memory regions with differential security levels or layering are now discussed in further detail with reference to the drawings.

FIG. 1 is a schematic diagram of a memory-oriented distributed computing system having a centralized and shared memory pool that includes secure and non-secure dynamic memory regions, in accordance with various examples of the presently disclosed technology. The centralized and shared memory pool may also include fluid and non-fluid dynamic memory regions, with these regions overlapping with the secure and non-secure memory regions.

Referring to FIG. 1, a computer system 100 (e.g., a memory-oriented computing system or a memory driven computing system) includes nodes 120 and a centralized memory pool 104, which is shared by the nodes 120. The nodes 120 may access the memory pool 104 via relatively high bandwidth network fabric 121, such as Gen-Z fabric, HPE Slingshot, or other network fabric. The memory pool 104 may be abstracted, or virtualized, by a memory manager 160. The memory pool 104 may include physical storage devices that corresponds to a heterogeneous or a homogeneous collection of physical, non-transitory storage media devices.

As examples, the physical, non-transitory storage media devices may include one or more of the following: semiconductor storage devices, memristor-based devices, magnetic storage devices, phase change memory devices, a combination of devices of one or more of these storage technologies, storage devices for other storage technologies, and so forth. The physical, non-transitory storage media devices may be volatile memory devices, non-volatile memory devices, or a combination of volatile and non-volatile memory devices. The non-transitory storage media devices may be part of storage arrays, as well as other types of storage subsystems.

A node 120 may be a computer platform (e.g., a blade server, a laptop, a router, a rack-based server, a gateway, a supercomputer and so forth), a subpart of a computer platform (e.g., a compute node corresponding to one or multiple processing cores of a blade server), or multiple computer platforms (e.g., a compute node corresponding to a cluster). Some of the nodes 120 may be compute nodes, and in some examples one or multiple nodes 120 may be administrative nodes. In certain examples, the nodes 120 may comprise a cluster of computing nodes.

As depicted in FIG. 1, a given node 120-1 may include one or multiple processing cores 124 (e.g., one or multiple central processing unit (CPU) semiconductor packages, one or multiple CPU cores, and so forth), which execute machine-executable instructions 136 (or "software") for purposes of forming one or more software components. As examples, these components may include one or multiple applications 128, one or multiple processes 144, one or multiple threads 148 of the processes 144, an operating system 159, one or multiple containers, one or multiple virtual machines, and so forth. In the execution of the machine-executable instructions 136, the processing core(s) 124 may, through a network interface 125 of the node 120-1, access the memory pool 104. As also depicted in FIG. 1, the node 120-1 may have a local memory 132 that stores the machine-executable instructions 136, data 140, and so forth. Other nodes 120 of the computer system 100 may have a similar architecture and similar components to the illustrated node 120-1. In some examples, software components illustrated on the node 120-1 may be distributed components, such as, for example, the operating system 159 may be a component of a distributed operating system (i.e., an operating system that is distributed among the nodes 120), the applications 128 may be components of distributed applications, and so forth.

The memory manager 160 performs memory management for the computer system 100, e.g., allocates unused dynamic memory regions from the memory pool 104 to entities of the computer system 100, deallocates dynamic memory regions to return the dynamic memory regions back to the memory pool 104, and manages access to the memory pool 104. For the particular implementation that is illustrated in FIG. 1, the memory manager 160 is part of the node 120-1 and may be part of the operating system 159. In accordance with some implementations, the operating system 159 may be a distributed operating system that is distributed among multiple nodes 120. As such, multiple nodes 120 may have operating system 159 components and corresponding memory manager 160 components. Therefore, in general, a "memory manager" refers to a single or distributed entity to manage dynamic memory, where the "managing" may include one or multiple of the following: allocating dynamic memory regions responsive to requests (from e.g., applications 128 run on nodes 120), deallocating dynamic memory regions (automatically for fluid dynamic memory regions 107 upon expiration of fluid memory validity time intervals), managing requests to access dynamic memory regions, and performing virtual-to-physical address translations. In some examples the memory manager that is part of centralized memory pool, also maintains a lookup tables with several physical memory sources annotations (type, size, etc.) that corresponds to ranges of virtual memory address space/regions and approximate latency in time granularity for performing request/response operations on those virtual memory regions, in concurrence to those fabric attached physical memory sources. In some examples, the memory manager 160 (e.g., the memory manager of an HPC environment) may be part of the memory fabric, e.g., a single or distributed entity that is part of the network fabric 121 and/or memory pool 104.

As part of the memory management, the memory manager 160 allocates dynamic memory regions for entities of the computer system 100 from unused dynamic memory regions of the centralized memory pool 104, deallocates dynamic memory regions to return the dynamic memory regions to the unused memory portion of the memory pool 104 (automatically for fluid dynamic memory regions 107), and manages virtual-to-physical memory address translations for memory accesses (e.g., read and write accesses). In accordance with some implementations, the memory manager 160 employs a superset virtualization (e.g., fluid vs. non-fluid virtualization) and within this virtualization, the memory manager 160 may employ another virtual memory management scheme (e.g., a page table-based memory management scheme). Pursuant to the virtualizations, the memory manager 160 can allocate fluid and non-fluid dynamic memory regions for entities of the computer system 100. In accordance with example implementations, the memory manager 160 may allocate a dynamic memory region for a computing entity in response to a memory allocation request. In this context, a "computing entity" refers to any hardware or software component of the computer system 100 that may provide a request to access the memory pool 104. As examples, the computing entities may include applications 128, threads 148, processes 144, containers, virtual memories, nodes 120, and so forth.

Memory manager 160 is also configured to allocate secure and non-secure regions of memory. For certain workloads, it may be desirable or necessary to encrypt selected datasets and store them in correspondingly reserved regions of memory. Accordingly, memory manager 160 may, upon receiving a request for allocation of a region of memory for a particular dataset, determine whether the dataset is to be encrypted. The determination may be carried out by comparing a data-oriented security ranking value associated with the dataset to a first security threshold. The first security threshold may indicate a minimum threshold for which a determination is made to encrypt or not encrypt the dataset. If the data-oriented security ranking value meets or exceeds the first security threshold, it is determined that the dataset is to be encrypted and stored in a region of memory (which may be virtual, physical, or both) reserved for encrypted data, as allocated by memory manager 160. If the data-oriented security ranking value is less than the first security threshold, memory manager 160 may allocate thereto a region of memory that is not reserved for encrypted data. For a given dataset, its associated security ranking value may be assigned thereto by an application executing on one or more processors of the system.

In carrying out the comparison, memory manager 160 may, in various embodiments, compare the data-oriented security ranking value for a particular dataset to multiple security thresholds. The comparisons to different security thresholds may be used to determine a particular encryption key for encrypting the dataset, a level (or strength) or layer of encryption for the dataset, or both. For example, if a data-oriented security ranking value for a dataset meets or exceeds a first security threshold but is less than a second security threshold, memory manager 160 may encrypt the dataset using a first encryption key or first encryption key from the first level of security/encryption strength layer. However, if the data-oriented security ranking value exceeds a second threshold, memory manager 160 may encrypt the dataset with a second, different encryption key from second level of security/encryption strength/layer. Each layer of encryption may have suite of ciphering algorithms that includes custom methods. Every layer encapsulates group of encryption methods that are of equivalent strength. Similarly, memory manager 160 may determine the strength or level of encryption based on such comparisons of data-oriented security ranks. The disclosure contemplates that any suitable number of security thresholds, encryption keys, and encryption levels may be utilized in a particular implementation.

After determining that a particular dataset is to be encrypted, the key with which it is to be encrypted, and/or the level/layer of encryption, memory manager 160 determines a particular region of the memory in which the encrypted dataset is to be stored. The centralized memory pool shown in FIG. 1 may be subdivided between encrypted (or secure) regions and unencrypted (or non-secure) regions. Within these regions there may be various sub-regions. Memory manager 160 may determine a particular sub-region in the memory to allocate to the encrypted dataset based on the encryption key used, the level/strength of encryption layer, or both.

It is noted that, in accordance with the discussion above, encrypted datasets may be stored in fluid or non-fluid regions of the centralized and shared memory pool in some embodiments. Accordingly, secure and non-secure regions of memory may, in such embodiments, overlap with fluid and non-fluid regions of memory. Encrypted datasets that are stored in a region of memory that is both secure and fluid may expire after a validity time interval has elapsed. The allowable validity time interval with minimum and maximum range can be associated with each security threshold. After the time has elapsed, memory manager 160 may de-allocate the particular region of memory occupied by the encrypted dataset, making it available for storing other data. On the other hand, encrypted datasets stored in non-fluid regions of memory may remain stored therein for an indefinite time period.

A dynamic memory allocation request, in accordance with some implementations, may be submitted by the computing entity (e.g., submitted by the entity executing machine executable instructions that generate the memory allocation request) or may be submitted on behalf of a computing entity (e.g., submitted by a compiler). In response to an allocation request, the memory manager 160 allocates dynamic memory regions for the computing entity. The allocated dynamic memory region may be a fluid dynamic memory region 107 or a non-fluid dynamic memory region 108. Allocated dynamic memory regions may also be secure (encrypted) memory regions 109 or non-secure (unencrypted) memory regions 110. It is noted that fluid and non-fluid memory regions may overlap with secure and non-secure memory regions. Accordingly, a memory region in one embodiment may be fluid/secure, non-fluid/secure, fluid/non-secure, or non-fluid/non-secure. As described above, fluid dynamic memory regions 107 may be configured with fluid memory validity time intervals, wherein upon expiration of their respective fluid memory validity time intervals, allocated fluid dynamic memory regions 107 are relinquished to the unused/free portion of centralized memory pool 104. In accordance with some implementations, the dynamic memory regions 107/108 may be invisible to the computing entity, as the allocation request may result in the memory manager 160 providing a contiguous range of allocated virtual memory addresses (corresponding to the allocated dynamic memory regions 107/108) to the computing entity. As further described above, secure memory regions 109 may store datasets that have been encrypted according to a designated encryption key and/or encryption level/strength, while non-secure memory regions 110 may secure datasets that are unencrypted.

In accordance with further implementations, the memory manager 160 may allocate a given dynamic memory regions for a specific component (e.g., a computer node 120 or application executing on the computer node 120) and allocate sub-components (e.g., memory sub-lanes) of the dynamic memory region to different subcomponents (e.g., threads, processes, applications and so forth) of the component.

Figure 2:
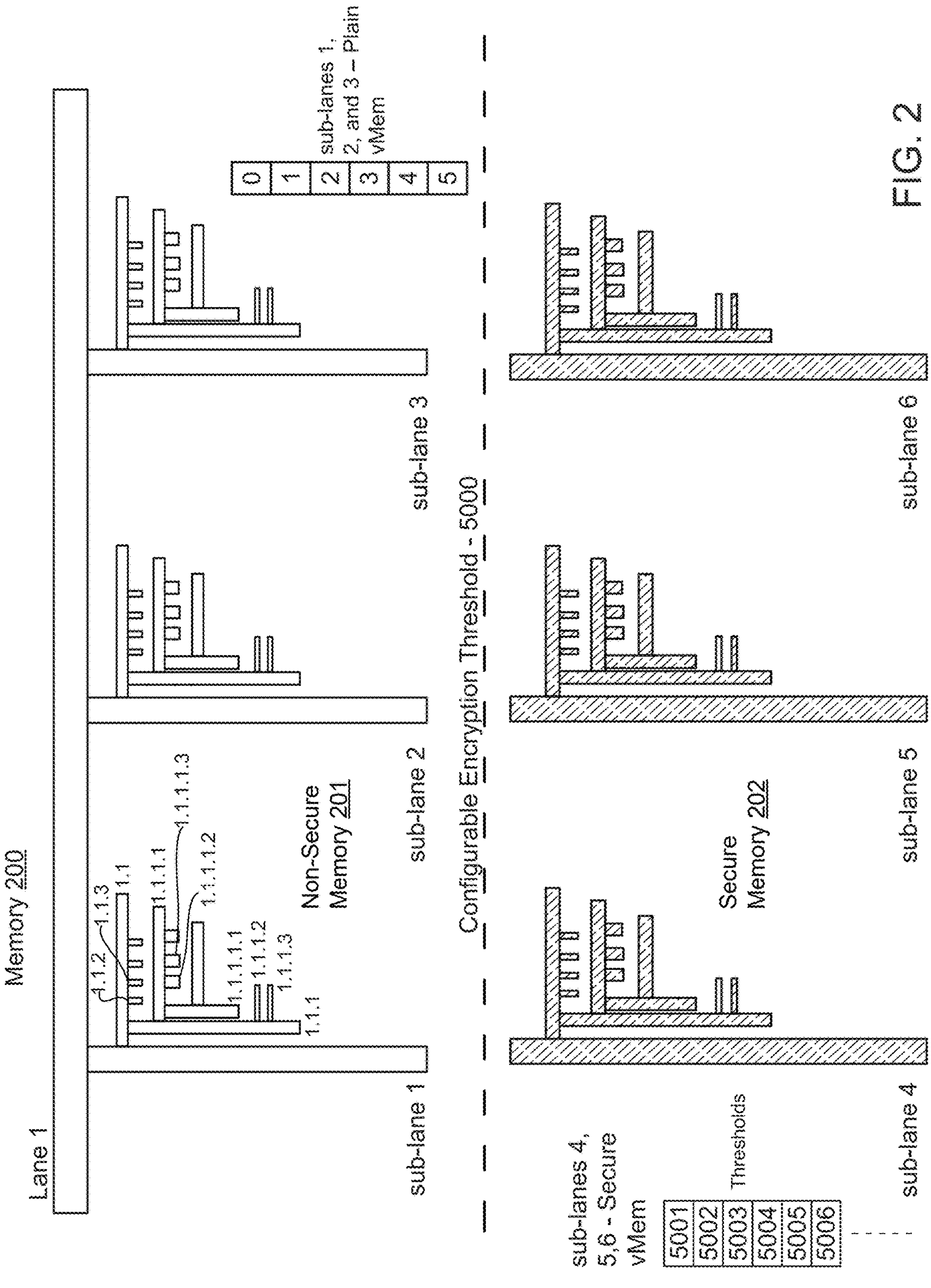
FIG. 2 is a diagram illustrating a division of a memory into secure and non-secure regions in accordance with the disclosure.

FIG. 2 is a diagram illustrating a division of a memory into secure and non-secure regions in accordance with the disclosure. Memory 200 as shown here is subdivided into non-secure memory 201 and secure memory 202. It is noted that the divisions shown in this example are indicative of a virtual memory address space, although similar divisions are possible and contemplated in a physical address space. It is further noted that the arrangement depicted here may represent only a portion of the memory space available in some embodiments of a system in accordance with this disclosure.

Memory 200 includes a first lane, Lane 1, and a number of sub-lanes, namely Sub-lane 1-Sub-lane 6. Sub-lanes 1-3 in this example fall within the non-secure memory region 201, while Sub-lanes 4-6 fall within the secure memory region 202. Within each sub-lane, there are additional sub-lanes in a nested hierarchy. For example, Sub-lane 1 includes an additional sub-lane 1.1, which in turn includes a sub-lanes 1.1.1, 1.1.2, 1.1.3, and so on. Sub-lane 1.1.1 includes sub-lanes 1.1.1.1, 1.1.1.2, and 1.1.1.3. Sub-lane 1.1.1.1 includes sub-lanes 1.1.1.1.1, 1.1.1.1.2, 1.1.1.1.3, and so on. Additional sub-lanes are also coupled to (and associated with) Sub-lane 1 and its corresponding sub-lanes. Other ones of the sub-lanes may be similarly organized, although not necessarily identically. The various sizes of the different sub-lanes may approximate the sizes of the address space occupied thereby, although this is not necessarily to scale.

A configurable encryption threshold is used to define a boundary between non-secure memory/dataset 201 and secure memory/dataset 202. The encryption threshold may, in one embodiment, be assigned a numerical value, with a corresponding value assigned as a data-oriented security ranking value assigned to for which memory space is to be allocated. In this example, the configurable encryption threshold has a value of 5000. A dataset for which memory space allocation has been requested with a data-oriented security ranking value that meets or exceeds the value 5000 will be allocated space in secure memory 202. In various embodiments, the specific location may depend on additional comparisons of the security ranking threshold to additional threshold (e.g., 5001, 5002, etc.). These additional comparisons may be used to determine an encryption key used to encrypt the dataset, and/or a strength/level at which the dataset is to be encrypted.

Encryption and decryption may be implemented in a number of different ways. For example, a memory or fabric manager may create a lookup table that includes a process identifier associated with a dataset, a lane associated with the process or dataset, and so on, so that only when the associated processes the allocated portion of memory, the memory/fabric manager decrypts and provides the data.

In another implementation, a key may be securely shared between the process associated with the dataset and the memory manager. The process of interest may have exclusive rights to decrypt the dataset when read from memory using standard cryptography libraries. In some embodiments, when the process ceases to exist, the memory manager can either delete the dataset from memory (thereby deallocating the region in which it is stored) or convert the dataset to plaintext rather than encrypted data. Alternatively, the process can hand off ownership of the dataset (and thus its corresponding region of memory) to another process.

In some embodiments, encryption methods and keys may be the same for the main lane and various ones of its sub-lanes, while these methods/keys may be different for the various sub-lanes in other embodiments. For example, in one portion of secure memory 202, datasets may be encrypted using a symmetric encryption key such as one of the various AES (Advanced Encryption Standard) keys, while another portion may utilize an asymmetric key such as PKI (Public Key Encryption). Furthermore, different levels of encryption may be applied for different datasets stored in different portions of secure memory 202. For example, the AES encryption key with sizes of 128, 192, 256, or 512 bits, with the larger sizes providing more robust (but more computationally intensive) encryption.

In some embodiments, the memory manager may periodically change encryption keys/methods and exchange that information with the process that created a particular dataset. The memory manager may notify the associated process such that it can decrypt the data upon accessing.

Figure 3A:
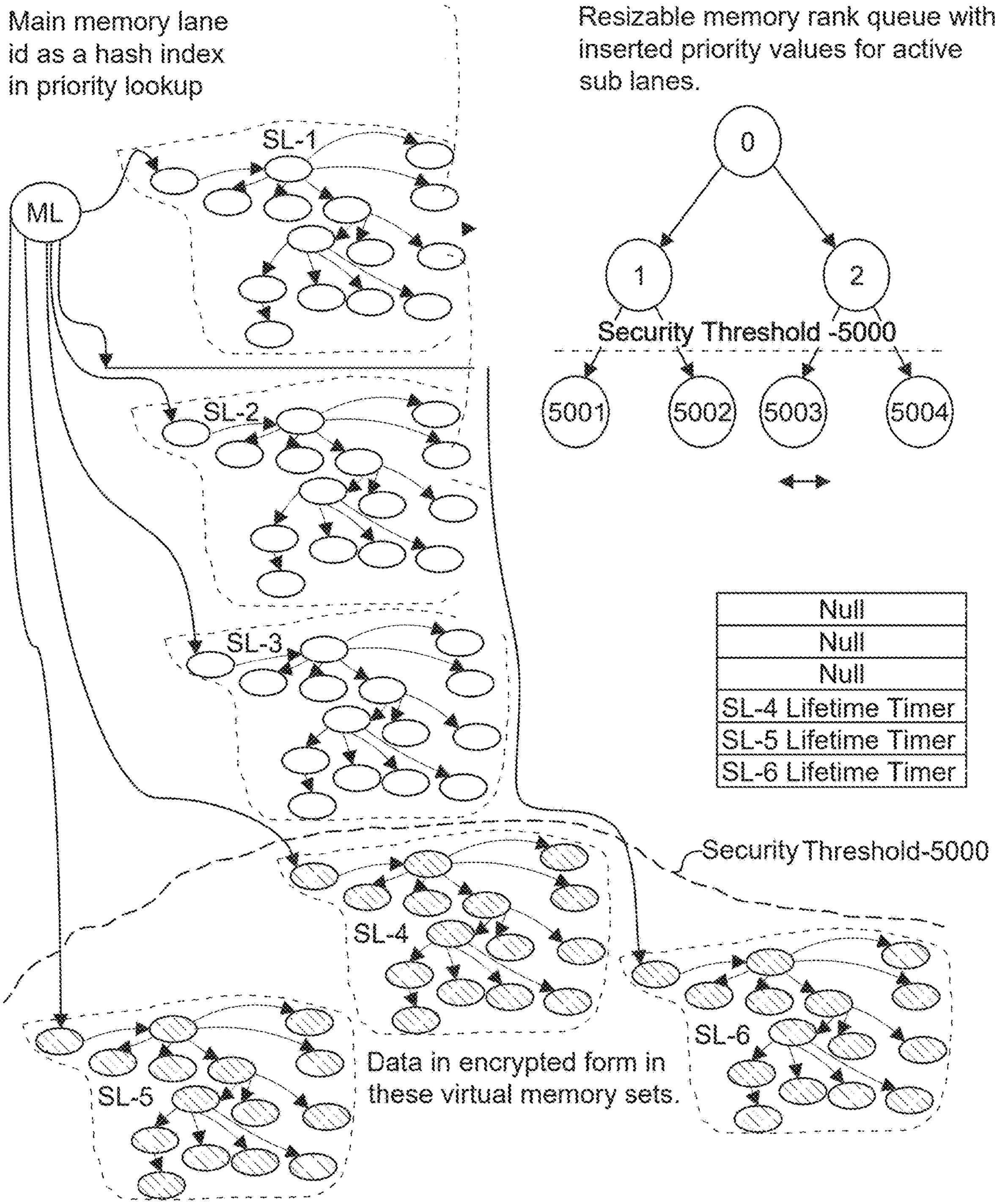
FIG. 3A is a diagram further illustrating the organization of a memory divided into secure and non-secure regions in accordance with the disclosure.

FIG. 3A is a diagram further illustrating the organization of a memory divided into secure and non-secure regions in accordance with the disclosure. In FIG. 3A, sub-lanes 1, 2 and 3 (SL-1, SL-2, and SL-3) each include a number of different virtual memory regions of memory (indicated by the ovals) that are dedicated to non-encrypted datasets. Sub-lanes 4, 5, and 6 (SL-4, SL-5, and SL-6) each include a number of virtual memory regions (indicated by the hatched ovals below the line of Security Threshold-5000) that are dedicated to storing datasets that are encrypted with various encryption keys and various levels of encryption. For example, the various virtual memory regions of SL-4 may be encrypted according to a first encryption key/method, the regions of SL-5 encrypted according to a second encryption key/method, and SL-6 encrypted according to a third encryption key/method. Within a particular sub-lane, different levels of encryption may be used even if the encryption key is otherwise the same. For example, a region indicated by a first oval of SL-4, connected directly to the main lane ML, may be encrypted using AES-128, while ovals that are progressively more deeply nested may be encrypted using AES-192, AES-256, and AES-512.

It is noted that the various encryption methods discussed herein are provided as examples, but are not intended to be limiting. The disclosure contemplates the use of any suitable encryption method, key, and/or encryption level.

As also discussed above, the various secure memory regions may overlap with the fluid memory regions as discussed elsewhere herein, and thus memory space for at least some encrypted datasets may be automatically deallocated after a predetermined time. Accordingly, sub-lanes 4, 5, and 6, or at least portions thereof, may overlap with fluid memory regions such that encrypted datasets stored therein remain only for a predetermined time before their respective memory spaces are deallocated. In this example, the timers for sub-lanes 4, 5 and 6 may each apply to all datasets stored therein, with the entirety of these respective sub-lanes being fluid memory regions. However, embodiments are possible and contemplated in which only a portion of each of these sub-lanes is fluid. It is further possible and contemplated that timers for determining the storage time of each dataset stored within a particular sub-lane may have a uniquely assigned timer with respect to other datasets stored within the same sub-lane. For example, an application associated with a particular dataset, in addition to assigning a security ranking value, may also assign a timer should the dataset be intended to be stored in a fluid memory region.

The right-hand portion of the drawing further illustrates how datasets can be assigned to memory. The circles labeled 5001, 5002, 5003, and 5004 represent different memory regions that can be allocated for datasets with security ranking values that meet or exceed these respective thresholds. For example, the datasets stored in the memory region designated by security threshold 5004 may have use a different encryption key and/or have a higher level of encryption than datasets stored in the other regions of this example.

Figure 3B:
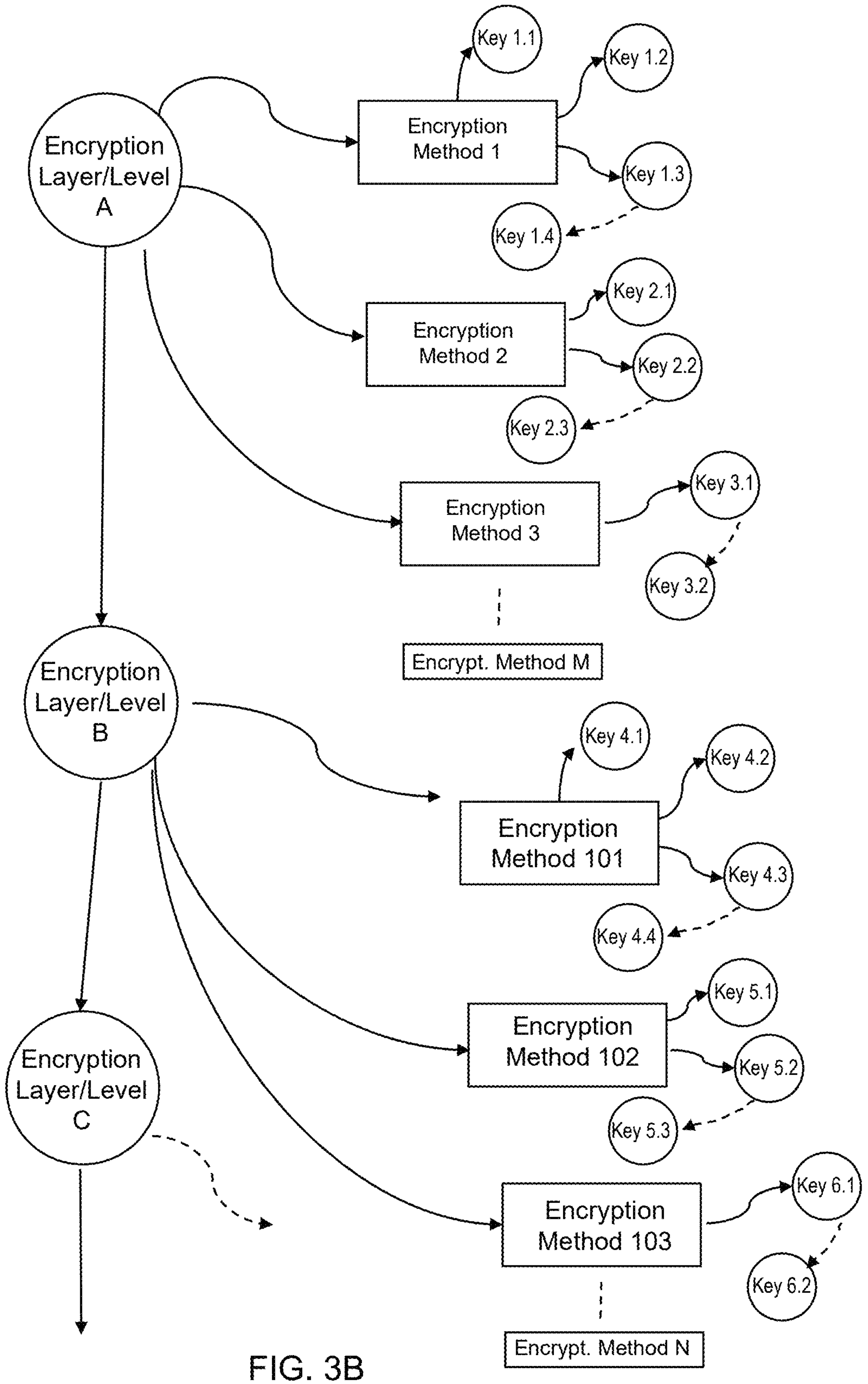
FIG. 3B is a diagram illustrating an encryption scheme for an implementation using secure regions of memory.

FIG. 3B is a diagram that illustrates various levels of encryption that may be used according to various implementations of the disclosure, and is presented in conjunction with Table 1 below.

TABLE 1

| Security Ranking Value(s) | Encryption Method Chosen | Key | Encryption methods applicable | Encryption Layer |
|---|---|---|---|---|
| 5001-5100 | 1-100 | All keys of, all methods in Encryption Layer/Level A | 1-100 | Encryption_layer/level_A |
| 5001 | 1 | Key 1.1 to Key 1.4 | | |

TABLE 1-continued

| Security Ranking Value(s) | Encryption Method Chosen | Key | Encryption methods applicable | Encryption Layer |
|---|---|---|---|---|
| 5010 | 2 | Key 2.1, Key 2.2 | | |
| 5101-5121 | 10-30 | All keys of encryption methods 10-30 in Encryption Layer/Level A | | |
| . . . | . . . | . . . | | |
| 7000-7010 | 101 | Select keys in encryption methods 4.1 to 4.3 | 101-200 | Encryption_layer/level_B |
| 7005 | 176 | All keys in this encryption method | | |
| 7015 | 125 | All keys in this encryption method | 101-200 | Encryption_layer/level_B |

As shown in both Table 1 above and in FIG. 3B, encryption may be performed on datasets that have a security ranking value that is equal to or greater than a minimum threshold value. In this example, a security ranking value for a particular dataset is assigned as a number, with the value 5001 being a minimum threshold used to determine whether or not a dataset is to be encrypted or non-encrypted. The level of and key used in encryption of a dataset as shown in Table 1 and FIG. 3B is, in this implementation, dependent its corresponding security ranking value relative to a number of different thresholds. For example, datasets with a security ranking value between 5001 and 5100 may be encrypted using any of encryption methods 1-100, which fall under encryption layer/level A. For a security ranking value of 5010 in the illustrated example, a specific encryption method 10 is chose with an encryption key of 2.1 or 2.2. For a security ranking threshold 7000-7010, the encryption level/layer is B, the encryption method is 101, and encryption keys from keys 4.1 to 4.4.

Generally speaking, the disclosure contemplates various implementations where the encryption layers/levels, methods, and keys may be selected based on the security ranking value to various thresholds. The disclosure further contemplates implementations in which only a single threshold is present, along with a single method, key, level, or layer.

Figure 3C:
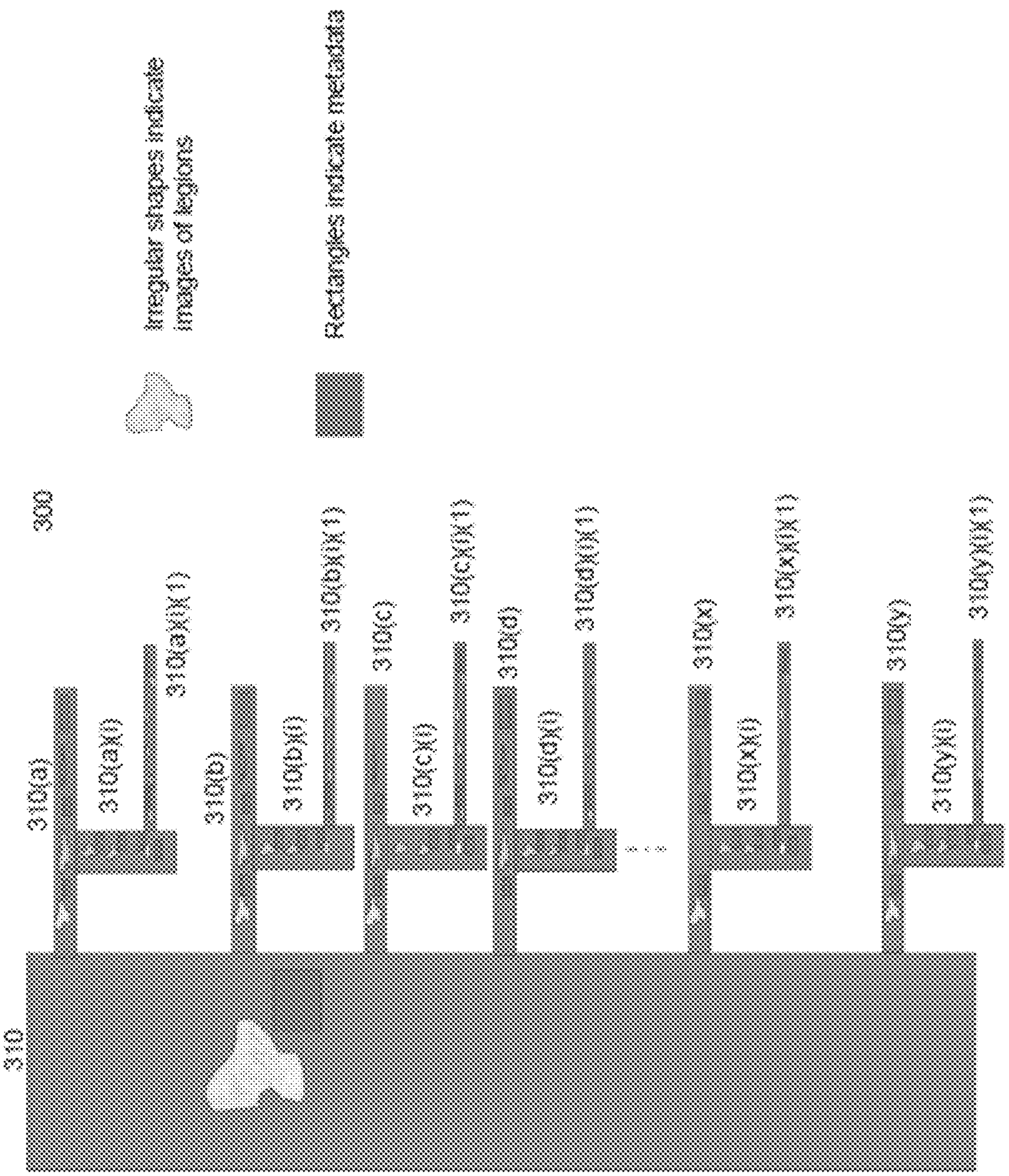
FIG. 3C illustrates one example of a high-performance computing task that can utilize secure regions of memory.

FIG. 3C is an example conceptual diagram depicting memory lanes and sub-lanes, in accordance with various examples of the presently disclosed technology. The memory lanes and sub-lanes may, at least in some cases, be reserved for storing encrypted datasets. Additionally, certain memory lanes and sub-lanes may also be fluid or non-fluid per the discussion above.

As alluded to above, examples of the presently disclosed technology can be specially adapted to improve other innovative dynamic memory region management systems/techniques. For instance (and as depicted in FIG. 3C), the presently disclosed memory management systems can reserve certain regions of memory to be secure regions by encrypting the datasets stored therein, using orthogonal memory lane-based management. As used herein, orthogonal lane-based memory management may refer to a virtual memory management scheme (also called a "memory lane-based virtualization") in which virtual memory is allocated in hierarchical memory lane structures. For example, a memory lane structure may be organized as a hierarchical tree of memory lanes, including a "main memory lane" (e.g., main memory lane 310) and one or multiple additional memory lanes, called "memory sub-lanes" (e.g., memory sub-lanes 310(*a*), 310(*b*), 310(*c*), etc.). A main memory lane and a memory sub-lane are both examples of "memory lanes." The main memory lane may correspond to the root node of the hierarchical tree. The one or multiple memory sub-lanes are descendants of the main memory lane and correspond to other non-root nodes of the hierarchical tree. In this context, a "descendant" of a memory lane, such as the main memory lane, refers to a direct descendent, or child, of the memory lane, as well as an indirect descendent (e.g., a grandchild or great grandchild) of the memory lane. A given memory sub-lane may correspond to a leaf node and have no children, and another given memory sub-lane may be a parent to one or multiple children. Per the present disclosure, some memory lanes and sub-lanes may be reserved for storing encrypted datasets. Memory lanes and sub-lanes may also be designated as fluid or non-fluid.

A memory manager may assign a set of contiguous virtual memory addresses to the above-described memory lane structure. If the memory lane structure has no memory sub-lanes (i.e., the memory lane structure has a main memory lane and no other memory lanes), then the main memory lane has the same set of contiguous virtual memory addresses. If, however, the memory lane structure has one or multiple memory sub-lanes, then one or multiple subsets of contiguous virtual memory addresses are reserved (or "carved out") from the set of contiguous virtual memory addresses assigned to the memory lane structure. In general, a contiguous set of virtual memory addresses for a child is reserved from the child's parent. In this context, an address being "reserved" from a parent means that the address is no longer part of the parent's assigned set of contiguous virtual memory addresses but rather, the address is now assigned to the child. Therefore, a child of a given memory lane (i.e., a main memory lane or memory sub-lane) may be reserved a corresponding set of contiguous virtual memory addresses from the given memory lane's assigned set of contiguous virtual memory addresses; a grandchild of the given memory lane may be reserved a set of contiguous virtual memory addresses from the set of contiguous virtual memory addresses assigned to the child; a great grandchild of the given memory lane may be reserved a set of contiguous virtual memory addresses assigned to the grandchild; and so forth.

Due to the above-described way in which the virtual memory addresses for a child are reserved from the parent, the child and parent are orthogonal to each other. In this context, a first memory lane being "orthogonal" to a second memory lane refers to no overlap existing between the contiguous set of virtual memory addresses assigned to the first memory lane and the contiguous set of virtual memory addresses assigned to the second memory lane. Because none of the assigned sets of virtual memory addresses overlap, all of the memory lanes of the memory lane structure should be orthogonal with respect to each other.

As will be described below, this memory lane structure is particularly well-suited for storing/managing parallel datasets (defined herein as nearly-congruent datasets describing a common characteristic/attribute). Accordingly, like examples of the presently disclosed technology, orthogonal memory lane-based memory management is particularly well-suited for improving dynamic memory region management for HPC applications that process/produce large numbers of parallel datasets during their extended run-times.

For example, the memory lane structure 300 may be used by one or more HPC entities that process/analyze brain lesion imaging. A main memory lane 310 of the memory lane structure 300 may store a first dataset including images of lesions (conceptually represented by the irregular shapes depicted in memory lanes and memory sub-lanes of FIG. 3C) associated with a first set of treatment parameters (e.g., method of treatment, drugs used, treatment time, and so forth) and corresponding metadata (conceptually represented by the rectangular shapes depicted in memory lanes and sub-lanes of FIG. 3C) representing the treatment parameters. Memory sub-lane 310(*a*), which is a first child of the main memory lane 310, may store a first parallel dataset including lesion images and metadata associated with a second set of treatment parameters refined/modified from the first set of treatment parameters (e.g., prolonged testing, different drugs, different treatment methodology, and so forth). Likewise, memory sub-lane 310(*b*) may store a second parallel dataset including lesion images and metadata associated with a third set of treatment parameters refined/modified from the first set of treatment parameters, and so on. Accordingly, memory sub-lanes 310(*a*)-310(*y*) may all store parallel datasets derived from/dependent on the first dataset stored in main memory lane 310.

As depicted, each of memory sub-lanes 310(*a*)-310(*y*) are parallel (i.e., similar) in structure—and include their own nested/descendant memory sub-lanes. For example, memory sub-lane 310(*a*)(*i*) is a child of memory sub-lane 310(*a*), and memory sub-lane 310(*a*)(*i*)(1) is a child of memory sub-lane 310(*a*)(*i*). Likewise, memory sub-lane 310(*b*)(*i*) is a child of memory sub-lane 310(*b*), and memory sub-lane 310(*b*)(*i*)(1) is a child of memory sub-lane 310(*b*)(*i*), and so on. Here, the first dataset may be stored across memory sub-lane 310(*a*) and its nested/descendant memory sub-lanes (i.e., memory sub-lane 310(*a*)(*i*) and memory sub-lane 310(*a*)(*i*)(1)). Likewise, the second dataset may be stored across memory sub-lane 310(*b*) and its nested/descendant memory sub-lanes (i.e., memory sub-lane 310(*b*)(*i*) and memory sub-lane 310(*b*)(*i*)(1)), and so on. Utilizing this parallel orthogonal memory lane structure to store parallel datasets allows examples of the presently disclosed technology to more easily identify differences across the stored parallel datasets. For example, a first portion/aspect/transformation of the first dataset stored within memory sub-lane 310(*a*)(*i*) may correspond to a first portion/aspect/transformation of the second dataset stored within memory sub-lane 310(*b*)(*i*). Because like portions/aspects/transformations of the first dataset and second dataset are stored in parallel memory sub-lanes (i.e., memory sub-lanes of similar size, structure, and relational locations), they may be analyzed together more easily efficiently.

As alluded to above, examples can be adapted to improve orthogonal memory lane-based memory management in various ways. For instance, memory sub-lanes 310(*a*)-(*d*) (and their descendant memory sub-lanes) may be designated as non-secure memory sub-lanes, with the datasets stored therein being unencrypted. By contrast, memory sub-lanes 310(*x*) and 310(*y*) (along with their descendant memory sub-lanes) may be designated as secure memory sub-lanes. Accordingly, during the run-time of an HPC application, these non-secure and secure memory sub-lanes may be allocated to store parallel datasets according to their respective data-oriented security ranking values. Datasets with a security ranking value that is less than a first (minimum) security threshold may be stored in the non-secure memory sub-lanes, while datasets having a security ranking value that is greater than or equal to a first security threshold may be stored in secure memory sub-lanes. As alluded to above, memory sub-lanes which descendent from the non-secure memory sub-lanes may also be designated as non-secure memory sub-lanes, and may have data-oriented security ranking values less than the first threshold, just as their ancestors. Similarly, memory sub-lanes which descendent from the secure memory sub-lanes may also be designated as secure memory sub-lanes, and may have data-oriented security ranking values that are at least equal to the first threshold.

Figure 4:
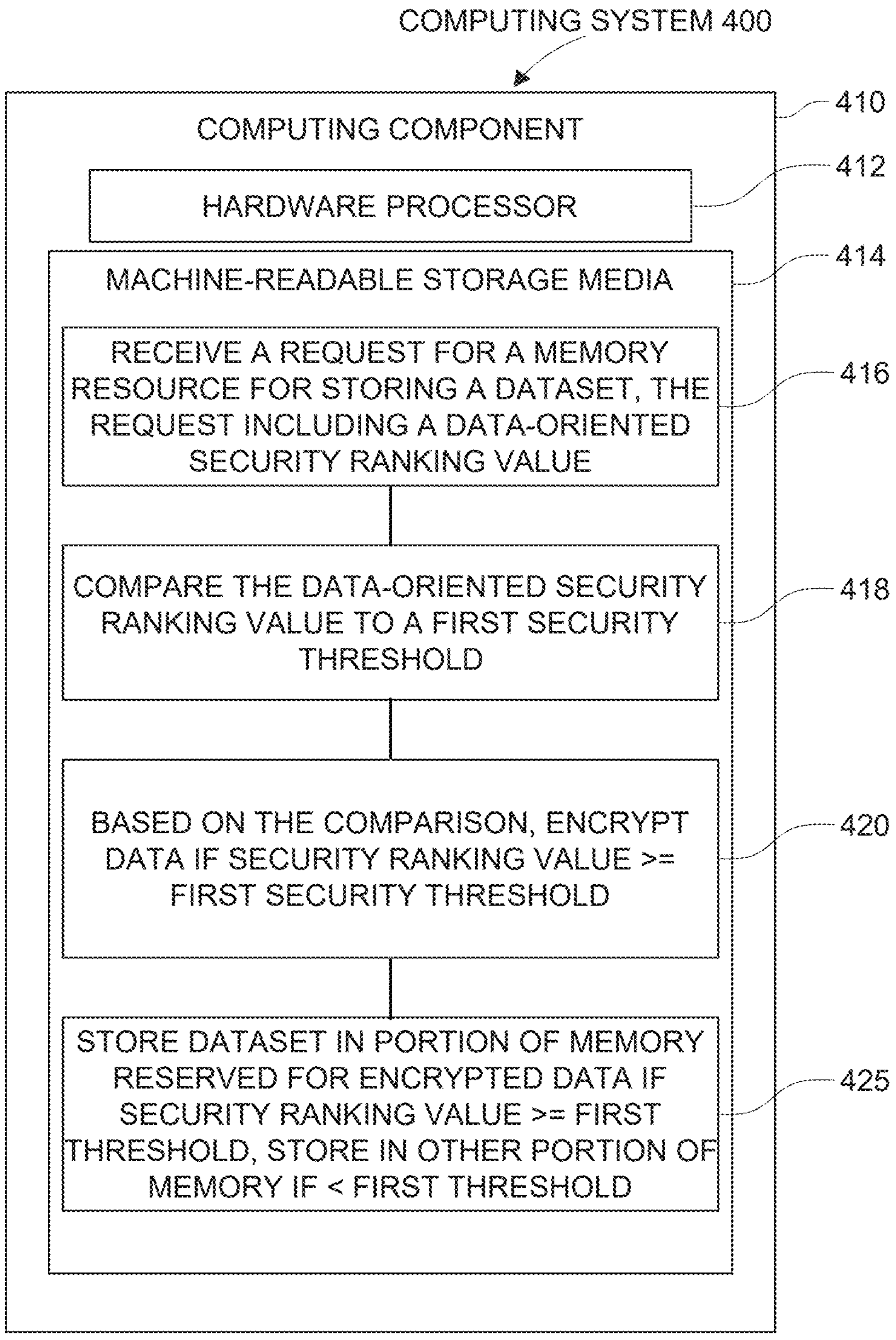
FIG. 4 is a diagram of a computing component including a machine-readable storage media and a methodology implemented by instructions stored therein in accordance with the disclosure.

FIG. 4 is a diagram of a computing component including a machine-readable storage media and a methodology implemented by instructions stored therein in accordance with the disclosure. In various embodiments, computing component 410 as shown herein may correspond to the computing system of FIG. 1, a portion thereof, or any other suitable computing system in which datasets may be selectively encrypted based on, e.g., a corresponding security ranking value.

Computing component 410 in the embodiment shown includes a hardware processor 412. Hardware processor 412 may be one or more central processing units (CPUs), semiconductor-based microprocessors, and/or other hardware devices suitable for retrieval and execution of instructions stored in machine-readable storage medium 414, and may be implemented on one or more integrated circuit die. Hardware processor 412 may fetch, decode, and execute instructions, such as instructions for carrying out operations 416-425 to control processes or operations as described therein. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 414, may be any electronic, magnetic, optical, or other physical storage device that contains or stores executable instructions. Thus, machine-readable storage medium 414 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 414 may be a non-transitory storage medium, where the term "non-transitory" does not encompass transitory propagating signals. As described in detail below, machine-readable storage medium 414 may be encoded with executable instructions, for example, instructions that, when executed by hardware processor 412, cause the operations described in 416-425 to be carried out.

The operations carried out by the execution of instructions stored on machine readable storage media 414 include receiving a request for a memory resource for storing a dataset, with the request including a data-oriented security ranking value that is associated with the dataset (416). The operations further include comparing the data-oriented security ranking value to a first security threshold (418). Based on the comparison determining that the security ranking value meets or exceeds at least the first security threshold, the dataset is encrypted (420). It is noted that this operation may include comparisons with additional, higher thresholds, with the various comparisons being used to determine a type and/or level of encryption used to encrypt the dataset. If it is determined that the security ranking value meets or exceeds at least the first security threshold, the dataset is encrypted and stored in a portion of memory reserved for encrypted data, while the dataset is stored in another portion of the memory (not reserved for encrypted data) if the security ranking value is less than the first security threshold (425).

Figure 5:
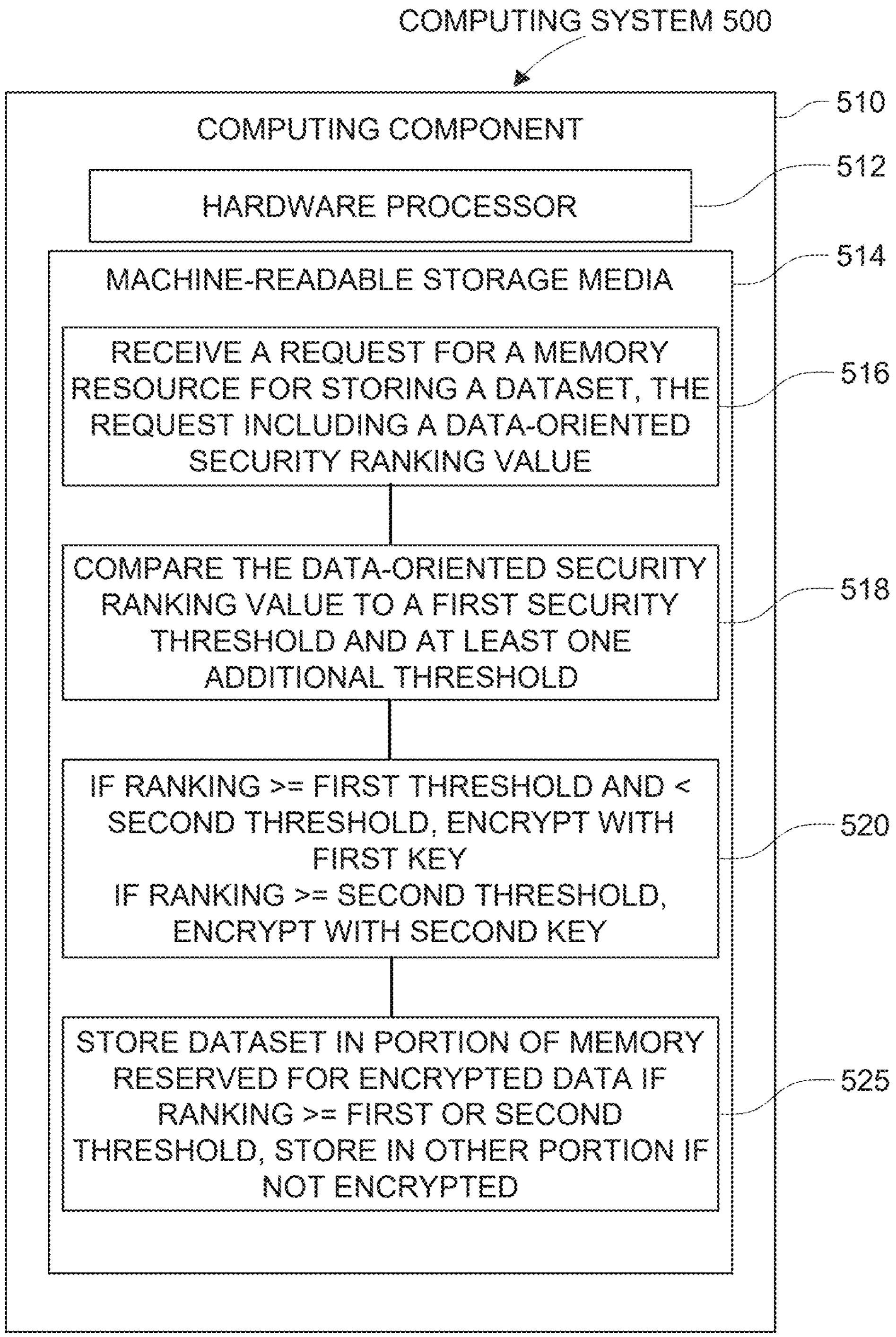
FIG. 5 is another diagram of a computing component including a machine-readable storage media and a methodology implemented by instructions stored therein in accordance with the disclosure.

FIG. 5 is another diagram of a computing component including a machine-readable storage media and a methodology implemented by instructions stored therein in accordance with the disclosure. In various embodiments, computing component 510 as shown herein may correspond to the computing system of FIG. 1, a portion thereof, or any other suitable computing system in which datasets may be selectively encrypted based on, e.g., a corresponding security ranking value.

Computing component 510 in the embodiment shown includes a hardware processor 512. Hardware processor 512 may be one or more central processing units (CPUs), semiconductor-based microprocessors, and/or other hardware devices suitable for retrieval and execution of instructions stored in machine-readable storage medium 514, and may be implemented on one or more integrated circuit die. Hardware processor 512 may fetch, decode, and execute instructions, such as instructions for carrying out operations 516-525 to control processes or operations as described therein. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

Execution of the instructions stored on machine readable storage media 514 include receiving a request for a memory resource for storing a dataset, with the request including a data-oriented security ranking value that is associated with the dataset (516). The operations further include comparing the data-oriented security ranking value to a first security threshold and at least one additional security threshold (518).

In 520, if the security ranking value is equal to or greater than the first security threshold but less than the second security threshold, the operations carried out by execution of the instructions on machine-readable storage medium 514 include encrypting the data with a first encryption key and/or first encryption key from a specified encryption layer/level. If the security ranking value is greater than or equal to a second (higher) security threshold, the operations carried out by execution of the instructions include encrypting the data with a second encryption key and/or first encryption key from a specified encryption layer/level that is different from the first. If the security ranking value is less than the first security threshold, no encryption is carried out.

In 525, the operations include storing the dataset in a region of memory reserved for encrypted data if the security ranking value equal to or exceeds at least one of the first and second thresholds. Otherwise, the dataset is stored in a region of memory that is not reserved for encrypted data. In the case where the dataset is encrypted, the particular portion of the memory, within the region reserved for encrypted data, may be determined at least in part by the encryption key.

Figure 6:
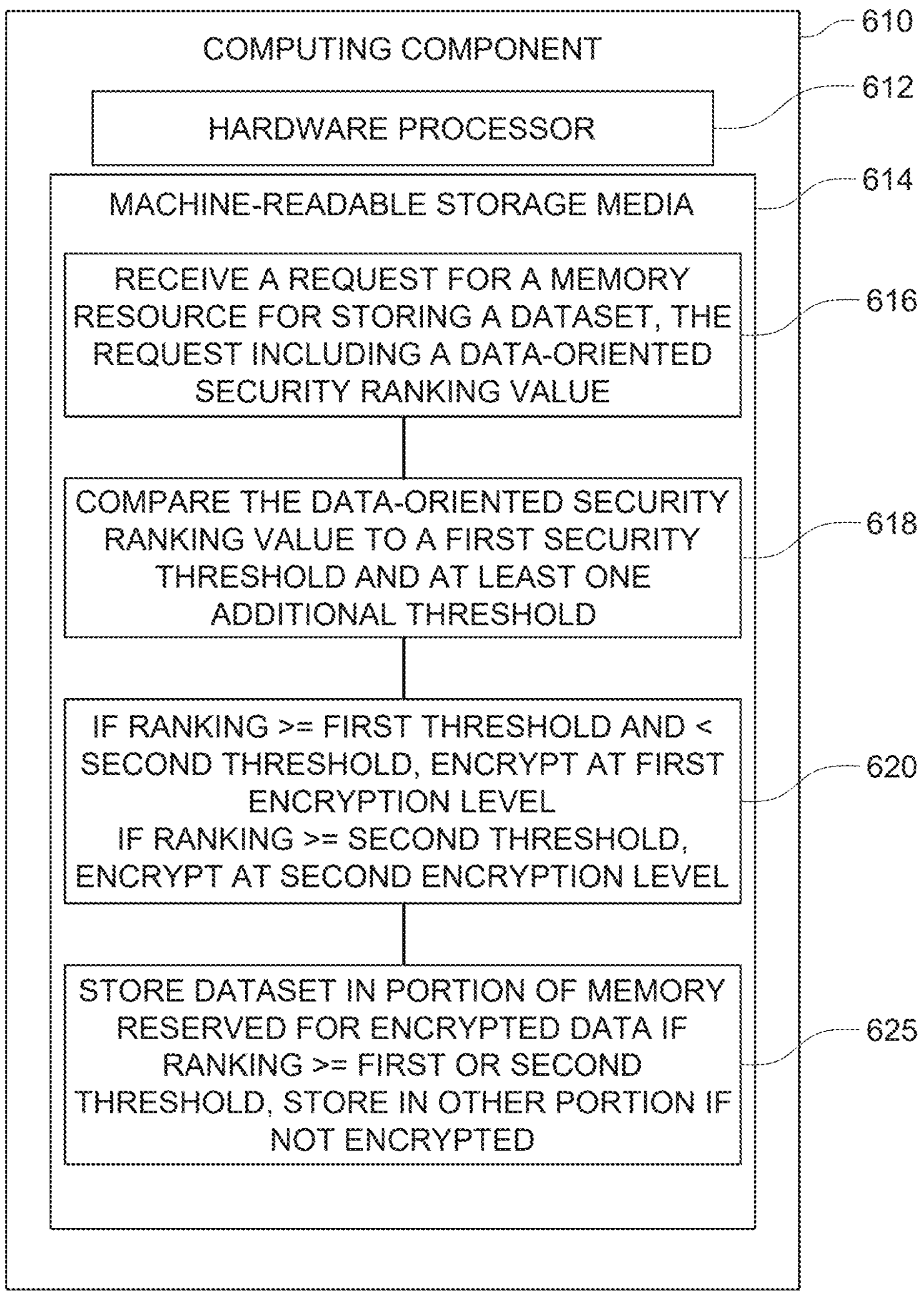
FIG. 6 is another diagram of a computing component including a machine-readable storage media and a methodology implemented by instructions stored therein in accordance with the disclosure.

FIG. 6 is another diagram of a computing component including a machine-readable storage media and a methodology implemented by instructions stored therein in accordance with the disclosure. In various embodiments, computing component 610 as shown herein may correspond to the computing system of FIG. 1, a portion thereof, or any other suitable computing system in which datasets may be selectively encrypted based on, e.g., a corresponding security ranking value.

Computing component 610 in the embodiment shown includes a hardware processor 612. Hardware processor 612 may be one or more central processing units (CPUs), semiconductor-based microprocessors, and/or other hardware devices suitable for retrieval and execution of instructions stored in machine-readable storage medium 614, and may be implemented on one or more integrated circuit die. Hardware processor 612 may fetch, decode, and execute instructions, such as instructions for carrying out operations 616-625 to control processes or operations as described therein. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

Execution of the instructions stored on machine readable storage media 614 include receiving a request for a memory resource for storing a dataset, with the request including a data-oriented security ranking value that is associated with the dataset (516). The operations further include comparing the data-oriented security ranking value to a first security threshold and at least one additional security threshold (618).

In 620, if the security ranking value is equal to or greater than the first security threshold but less than the second security threshold, the operations carried out by execution of the instructions on machine-readable storage medium 614 include encrypting the data at a first level (or strength) of encryption. If the security ranking value is greater than or equal to a second (higher) security threshold, the operations carried out by execution of the instructions include encrypting the data with a second level/strength of encryption that is stronger than the first. If the security ranking value is less than the first security threshold, no encryption is carried out.

In 625, the operations include storing the dataset in a region of memory reserved for encrypted data if the security ranking value equal to or exceeds at least one of the first and second thresholds. Otherwise, the dataset is stored in a region of memory that is not reserved for encrypted data. In the case where the dataset is encrypted, the particular portion of the memory, within the region reserved for encrypted data, may be determined at least in part by the strength of encryption applied to the dataset.

It is noted that the operations described with reference to FIGS. 5 and 6 are not mutually exclusive and can, in various embodiments, be combined with one another. In some instances, different levels of encryption may result in encryption being carried out with different encryption keys. Encryption at different levels using an otherwise same encryption key is also possible and contemplated.

Figure 7:
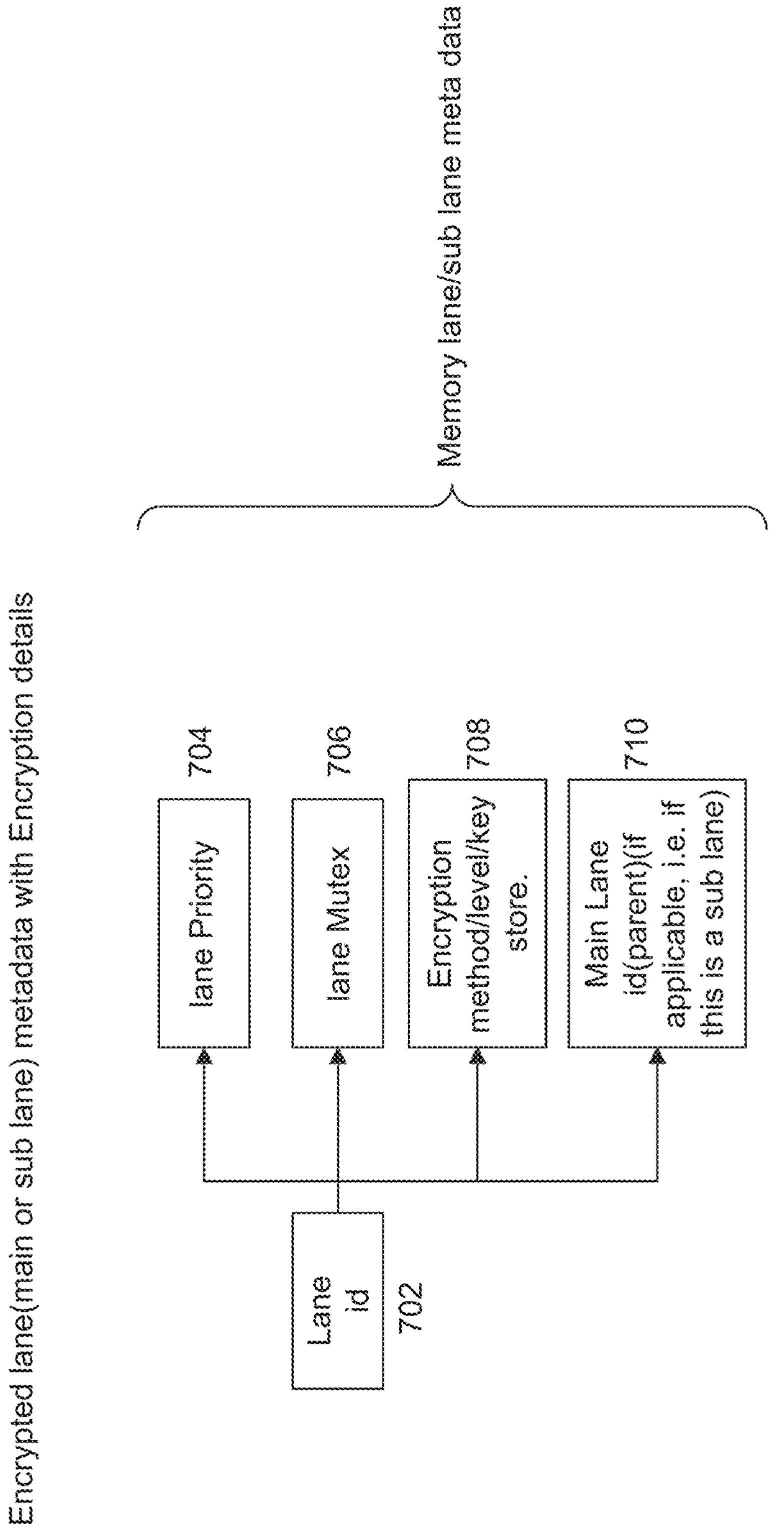
FIG. 7 is a diagram illustrating metadata associated with a dataset stored in a secure region of memory in accordance with the disclosure.

FIG. 7 is a diagram illustrating metadata associated with a dataset stored in a secure region of memory in accordance with the disclosure. When a dataset is stored in a portion of memory, certain metadata associated therewith is generated. This data includes a lane identifier 705 to identify the lane or sub-lane in which the dataset is stored, and may also include a main lane identifier 710 if the dataset is stored in a sub-lane. A lane priority value 704 indicating an access priority for the datasets stored in the lane may also be included, and may be used in arbitrating among competing access requests. An indication of mutual exclusivity of the lane, which may be used to streamline access to the dataset when it is mutually exclusive to a particular thread. Encryption information 708 (method/level/key) may also be included in the metadata.

Figure 8:
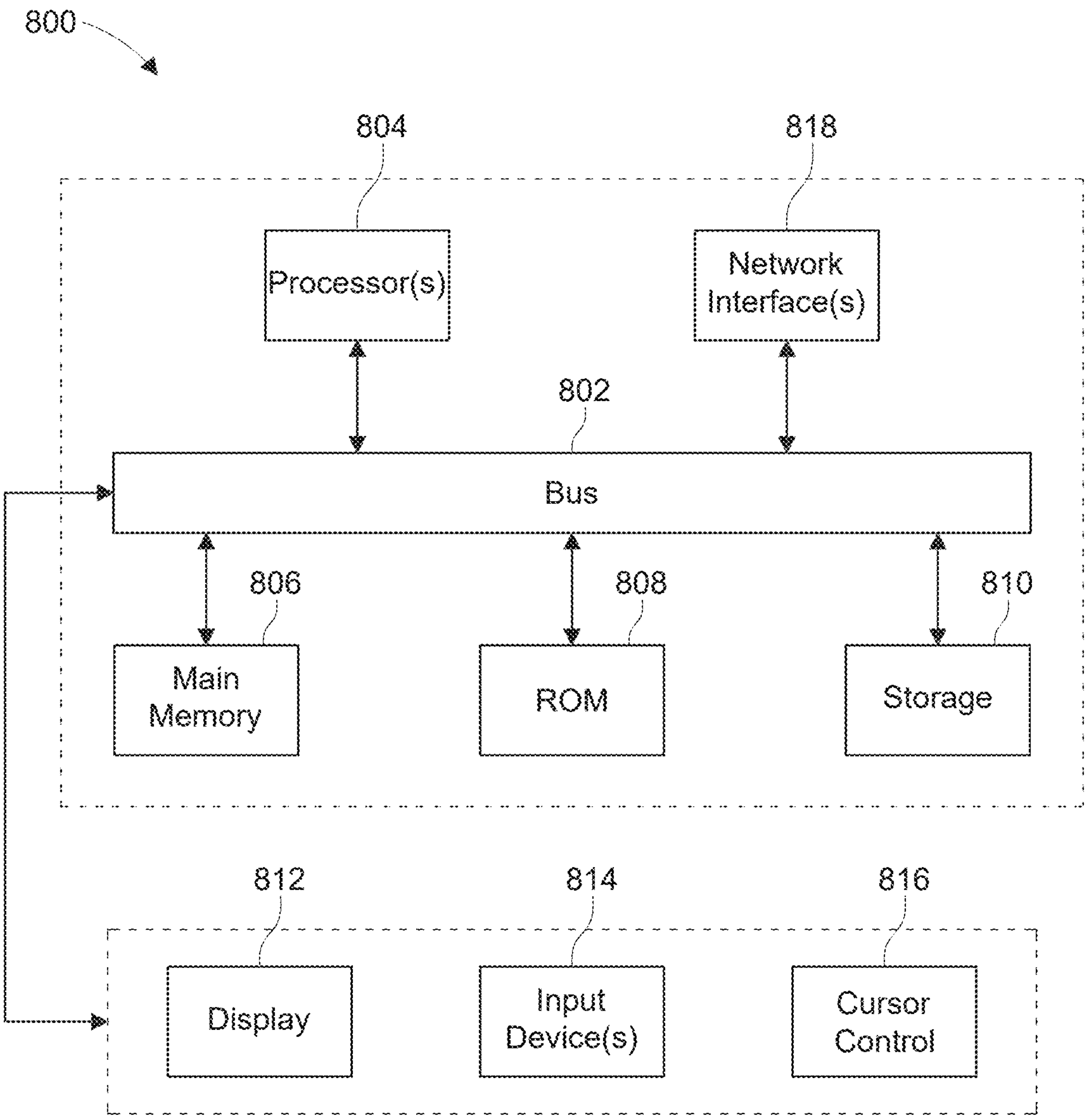
FIG. 8 depicts a block diagram of an example computer system in which various of the examples described herein may be implemented.

FIG. 8 depicts a block diagram of an example computer system 800 in which various examples of the disclosed technology described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Per the discussion above, computer system 800 may encrypt certain datasets that are stored in main memory 806. The encryption may be carried out according to a security ranking value associated with the dataset and various security thresholds. If a security ranking value for a particular dataset meets or exceeds a first (minimum) security threshold, the dataset is encrypted and stored in a region of main memory 806 that is reserved for encrypted data. The encryption key and level at which the dataset is encrypted may be determined based on comparisons of the security ranking value to one or more additional thresholds. Additionally, the particular location of the reserved region may also be determined by the encryption key and/or the encryption level used to encrypt the dataset.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some examples, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one example of the disclosed technology, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

receiving, in a computer system, a request for dynamic allocation of a first region of a memory as a secure region of the memory or a non-secure region of the memory, wherein the request includes a data-oriented security ranking value associated with a dataset to be stored in the first region of the memory;

comparing the data-oriented security ranking value to a first security threshold;

in response to determining that the data-oriented security ranking value meets or exceeds the first security threshold:

encrypting the dataset using an encryption key; and allocating the first region of the memory in a first portion of the memory reserved for encrypted data; and in response to determining that the data-oriented security ranking value does not meet or exceed the first security threshold:

allocating the first region of the memory in a second portion of the memory reserved for unencrypted data without encrypting the dataset using an encryption key.

2. The method of claim 1, further comprising:

comparing the data-oriented security ranking value to a plurality of additional thresholds; and selecting a level of encryption based on the comparing.

3. The method of claim 1, further comprising:

determining, for a first dataset, that a corresponding data-oriented security ranking value exceeds the first security threshold but is less than a second security threshold;

determining, for a second dataset, that a corresponding data-oriented security ranking value exceeds the second security threshold;

encrypting the first dataset at a first level of encryption;

encrypting the second dataset at a second level of encryption; and storing the first and second datasets in respective portions of the memory reserved for encrypted data.

4. The method of claim 1, further comprising:

determining for each of first and second datasets that respective data-oriented security ranking values exceed at least the first security threshold;

encrypting the first dataset using a first security key;

encrypting the second dataset using a second security key different from the first security key; and storing the first and second datasets in respective portions of the memory reserved for encrypted data.

5. The method of claim 1 further comprising de-allocating the first region of memory after a predetermined amount of time.

6. The method of claim 1, wherein the first portion of the memory reserved for encrypted data comprises a first sub-portion and a second sub-portion that is orthogonal to the first sub-portion.

7. The method of claim 6, wherein the method further comprises:

encrypting a first data set according to a first encryption key;

storing the first data set in the first sub-portion;

encrypting a second data set according to a second encryption key; and storing the second data set in the second sub-portion.

8. The method of claim 1, further comprising:

executing, by the computer system, an application, wherein the application utilizes the dataset;

determining, by the application, the data-oriented security value.

9. A system comprising:

one or more processors;

a non-transitory computer-readable medium coupled to the one or more processors and storing instructions thereon that, when executed by at least one of the one or more processors, cause the system to:

determine a security ranking value for a dataset to be stored in a memory of the system;

generate and transmit a request to a memory manager to store the dataset, the request including (i) the security ranking value that is to be compared to a first security threshold by the memory manager and (ii) a request for dynamic allocation of a region of the memory as a secure region of the memory; and in response to the memory manager determining that the security ranking value is equal to or greater than the first security threshold:

encrypt the dataset;

allocate the region of memory in a portion of the memory reserved for encrypted data; and cause the dataset to be stored in the portion of the memory reserved for encrypted data.

10. The system of claim 9, wherein the instructions are further executable to cause the dataset to be stored in a portion of the memory reserved for unencrypted data in response to the memory manager determining that the security ranking value is less than the first security threshold.

11. The system of claim 9, wherein the instructions are further executable to:

cause the dataset to be encrypted using a first security key in response to determining that the security ranking value is equal to or greater than the first security threshold but less than a second security threshold; and cause the dataset to be encrypted using a second security key different from the first security key in response to determining that the security ranking value is greater than the second security threshold.

12. The system of claim 9, wherein the instructions are further executable to:

cause the dataset to be encrypted using a first level of encryption in response to determining that the security ranking value is equal to or greater than the first security threshold but less than a second security threshold; and cause the dataset to be encrypted using a second level of encryption in response to determining that the security ranking value is greater than the second security threshold.

13. The system of claim 9, wherein the portion of the memory reserved for encrypted data comprises a first sub-region and a second sub-region orthogonal to the first sub-region.

14. The system of claim 13, wherein the instructions are further executable to:

cause a first dataset encrypted using a first encryption key to be stored in the first sub-region; and cause a second dataset encrypted using a second encryption key to be stored in the second sub-region.

15. The system of claim 9, wherein the system includes:

a plurality of processors; and a network fabric;

wherein the memory is a centralized memory coupled to each of the plurality of processors via the network fabric.

16. The system of claim 9, further comprising instructions executable to cause an application to assign the security ranking value to the dataset.

17. A non-transitory computer-readable medium storing instructions that, when executed by one or more processing circuits of a computer system, cause the computer system to:

receive a request to store a dataset in a memory of the computer system and allocate a region of the memory in a portion of the memory reserved for encrypted data;

compare a security ranking value of the dataset to a first security threshold;

cause the dataset to be encrypted, in accordance with an encryption key, in response to determining that the security ranking value of the dataset is equal to or greater than the first security threshold; and cause the dataset to be stored within the portion of the memory reserved for encrypted data in response to the dataset being encrypted.

18. The computer-readable medium of claim 17, wherein the instructions are further executable to:

cause the dataset to be encrypted using a first type of encryption in response to the security ranking value being less than a second security threshold but at least equal to the first security threshold; and cause the dataset to be encrypted using a second type of encryption in response to the security ranking value being greater than the second security threshold.

19. The computer-readable medium of claim 18, wherein the instructions are further executable to:

cause a first dataset to be stored in a first sub-region of memory in response to the first dataset being encrypted using the first type of encryption; and cause a second dataset to be stored in a second sub-region of memory in response to the second dataset being encrypted using the second type of encryption;

wherein the first and second sub-regions are within a range of addresses corresponding to the region of memory reserved for storing encrypted data.

20. The computer-readable medium of claim 19, wherein the instructions are further executable to cause at least one of the first and second sub-regions of memory to be de-allocated after a predetermined amount of time has elapsed.

* * * * *